UNITED STATES PATENT OFFICE.

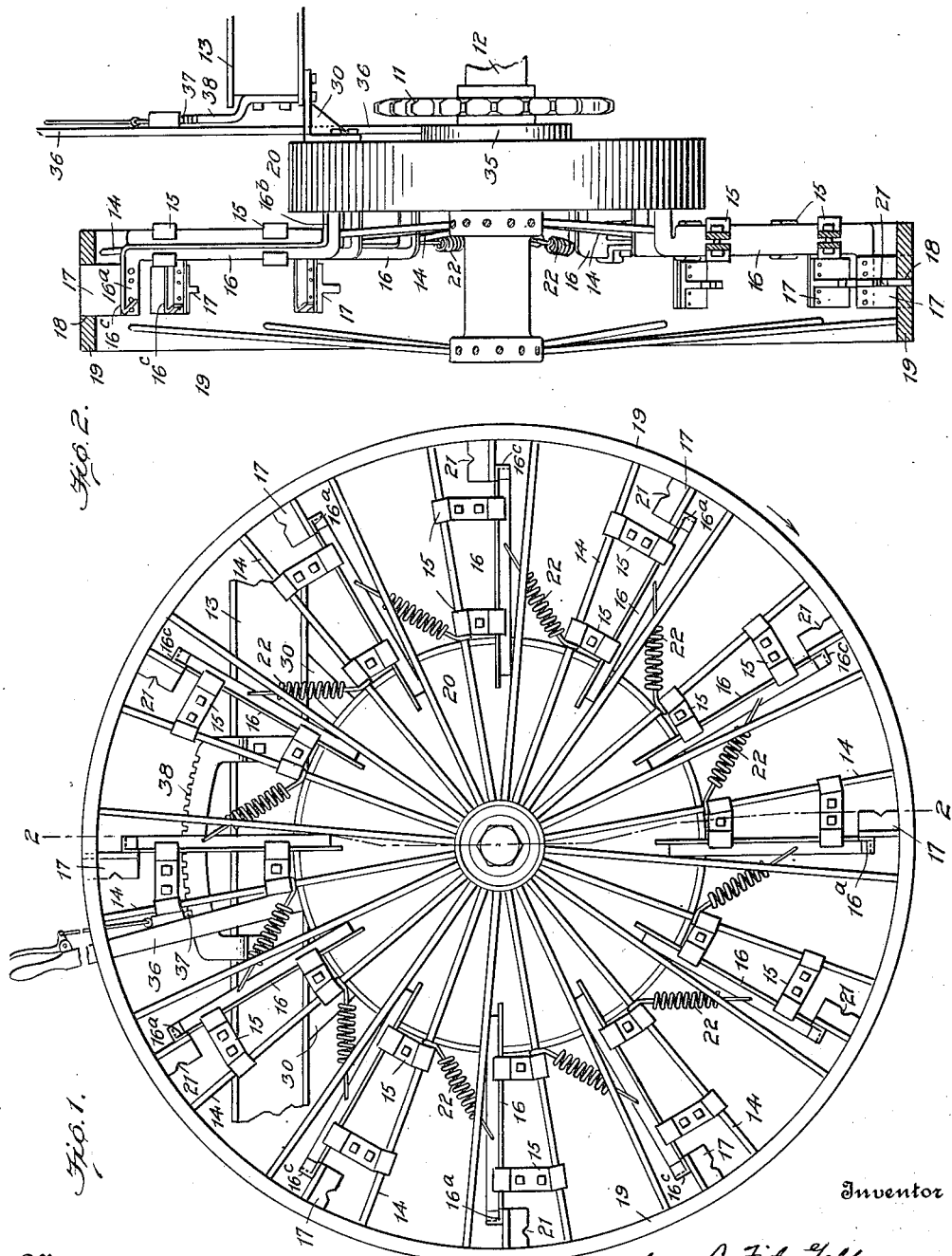

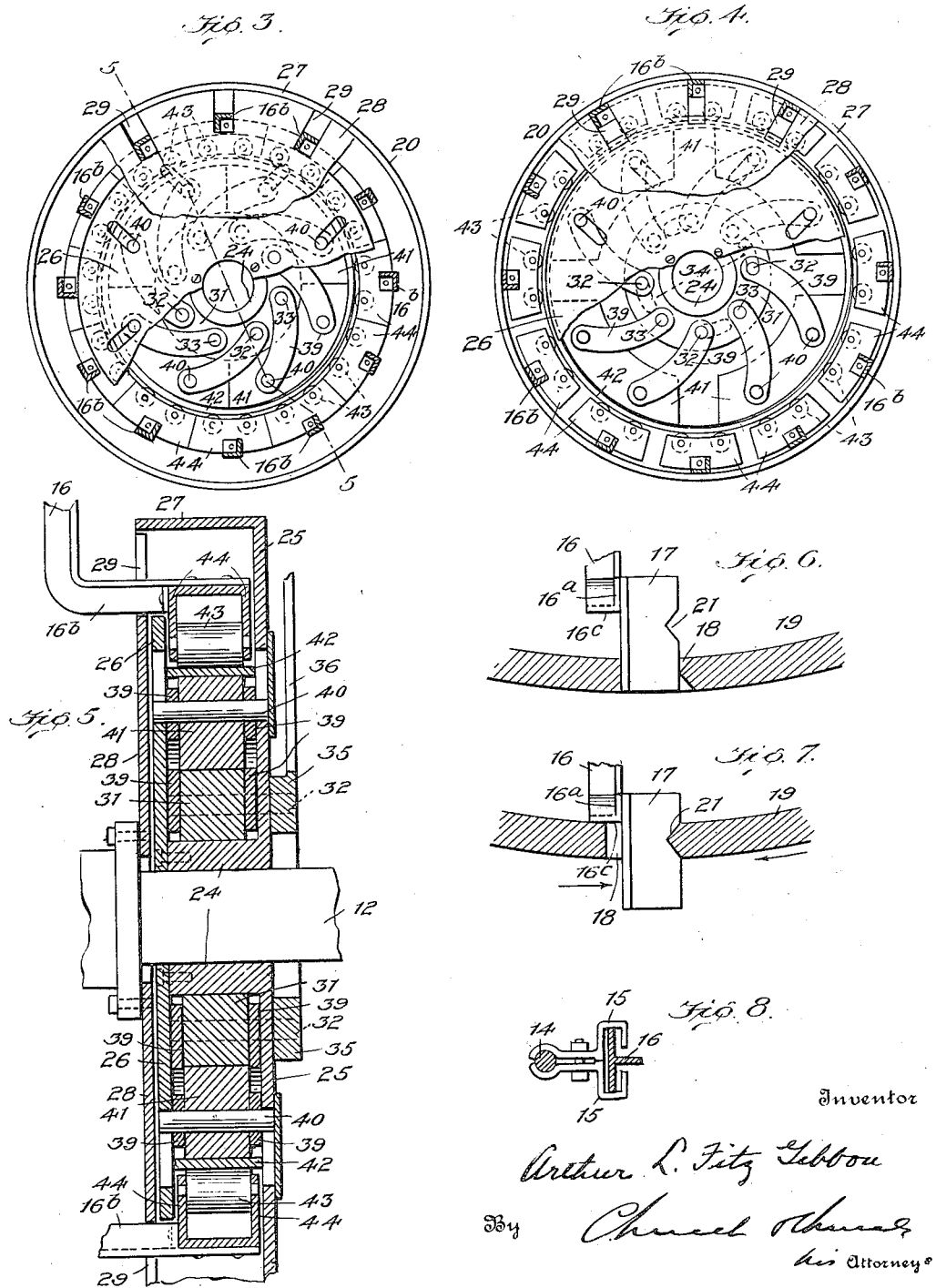

ARTHUR L. FITZ GIBBON, OF WASHINGTON, DISTRICT OF COLUMBIA.

TRACTION-WHEEL.

1,323,746.  Specification of Letters Patent.  Patented Dec. 2, 1919.

Application filed May 2, 1919. Serial No. 294,224.

*To all whom it may concern:*

Be it known that I, ARTHUR L. FITZ GIBBON, a citizen of the United States, residing at Washington, in the District of Columbia, have invented certain new and useful Improvements in Traction-Wheels; and I do hereby declare the following to be a full, clear, and exact description of the same, reference being had to the accompanying drawings, forming a part of this specification.

This invention relates to vehicle wheels and especially to wheels adapted for use on tractors and other heavy vehicles. The tread portions of wheels used on vehicles of this character are usually provided with a series of projections adapted to penetrate the earth, when the vehicle is operated in the field, to afford the wheel a better hold or grip on the earth, thus increasing the tractive power of the wheel. When, however, the vehicle is propelled over a road, the tendency of the projections to penetrate the road surface causes an undue amount of wear on the road. To prevent this, the present invention contemplates the provision of a wheel in which the ground penetrating elements or members can be projected beyond the periphery of the wheel when necessary or they can be retracted to a position within the wheel where they can not come in contact with the road surface.

The primary object of the invention is to provide a structure in which the penetrating elements or members will normally be yieldingly held in their retracted, inoperative position but when they have been projected to their operative position they will be locked in that position by the rotative force of the wheel as they successively come in contact with the ground. Another object is to provide a mechanism of this character that can readily be applied to the driving wheels or the driven wheels of the vehicle. These objects will be clearly set forth in the following description of the embodiment of the invention shown in the accompanying drawings, in which description other objects will be particularly pointed out or will otherwise appear.

In said drawings:

Figure 1 is a side elevation of a wheel with the present invention applied thereto, only one wheel being shown as the mechanism is the same whether it be applied to a driving wheel or a driven one;

Fig. 2 is a sectional view on the line 2—2, of Fig. 1, the housing or casing of the mechanism for actuating the penetrating members being shown in plan;

Fig. 3 is a detail sectional view, in a vertical plane, of the housing, showing the mechanism for projecting the penetrating members into their operative position, said mechanism being shown in the position it occupies when the penetrating members are in their retracted, inoperative position;

Fig. 4 is a view similar to Fig. 3 showing the projecting mechanism in the position it occupies when the penetrating members have been moved to their operative position;

Fig. 5 is a sectional view on the line 5—5 of Fig. 3;

Figs. 6 and 7 are detail views of the ground penetrating members in their inoperative and operative positions, respectively, showing the means by which said members are locked in their operative position;

Fig. 8 is a detail view illustrating the manner in which the carrier bars of the ground penetrating members are mounted on the wheel.

Like numerals indicate the same parts in the several views.

As stated, only one wheel is shown and in the present instance this is illustrated as one of the driving wheels, being adapted to be driven from a suitable source of power by the sprocket wheel 11 mounted on the axle 12 on which the vehicle frame 13 is mounted in any well known manner.

Secured to each of the alternate spokes 14 of the wheel is a pair of brackets 15 in which are loosely and slidably mounted radially extending metallic bars 16 adapted to carry the ground penetrating members 17. The intermediate portion of bars 16 is of T shape in cross section but their end portions 16$^a$ and 16$^b$ are preferably angular in cross section. The outer ends 16$^a$ of bars 16 are bent at right angles to the bars and extend axially of the wheel. Rigidly secured to the axially extending portions 16$^a$ are the ground penetrating members 17 adapted to be projected through apertures 18 in the rim 19, these penetrating members being preferably formed of a short bar of metal T-shape in cross section to obtain the greatest degree of rigidity. The inner ends 16$^b$ of the carrier bars 16 are bent at right angles in a direction opposite to the ends 16ª and extend into a housing 20 for the mechanism by which the penetrating members are moved into operative position, all of which will presently be described. Each of the ground penetrating members 17 is provided with a recess 21 facing in a direction opposite to that in which the wheel is rotated and adapted to be brought into alinement with the rim 19 when the penetrating members are projected to their operative position.

Normally these penetrating members are held in a position where their outer ends will lie within or substantially flush with the tread surface of the rim, as shown in Fig. 6, and when they are projected into their operative position they project beyond the tread surface with the recesses 21 substantially in alinement with the rim. However, as the carrier bars 16 are loosely mounted in brackets 15, (see Fig. 8) and are permitted a slight movement toward and away from the walls of apertures 18, a spring 22 interposed between each of the carrier bars and one of the spokes will normally hold the recesses in the individual penetrating members out of engagement with the wall of the respective aperture in the rim. With the penetrating members in their operative position, the rotation of the wheel brings them successively in contact with the ground whereupon the tension of springs 22 is overcome and the penetrating members are momentarily held stationary while the rim continues to rotate, due to the carrier bars of the penetrating members being loosely mounted in their brackets. This continued advance of the rim forces the wall of aperture 18 into the recess 21 in the individual penetrating members as said members successively come in contact with the ground and are held stationary, and locks that particular member, which is in contact with the ground, in its projected position. The individual penetrating members remain locked until they have been withdrawn from the ground, when springs 22 will disengage the rim and recess.

To impart strength to the penetrating members, and to insure against their becoming accidentally unlocked while in the ground, the bottom face 16ᶜ of the outer axially extending portion 16ª of the carrier bars is adapted to abut against the inner face of rim 19 when the penetrating members are in their operative position, thus preventing said members from turning on the pivotal points formed by the wall of the apertures 18 in the rim.

The housing 20 heretofore referred to as containing the mechanism for moving the ground penetrating members into their operative position, consists of a hub portion 24 mounted on axle 12, and radially extending sides 25, 26 secured thereto. The side 25 of the housing is provided at its outer edge with an annular flange 27 which overlaps the outer edge of a dust guard plate 28 mounted on the hub of the wheel and provided with openings 29 through which the ends 16ᵇ of the carrier bars extend into the housing, the side 26 of the housing being shorter than the other side so as not to interfere with the carrier bars when the latter are revolved by the rotation of the wheel. To permit the present invention to be applied to the driving or driven wheels of the vehicle the hub 24 is loosely mounted on the axle, and does not rotate therewith, the inner side 25 of the housing being connected to the frame of the vehicle by connecting bars 30.

Loosely mounted on the hub 24 is a ring 31 having a series of pins 32, 33 extending transversely therethrough, pins 32 projecting through short slots 34 in the side 25 of the housing and having their ends secured to a ring 35 on the exterior of the housing adapted to be rocked by a hand lever 36 provided with a pawl 37 coöperating with a toothed segment 38 for holding the lever in any desired position. A pair of rigid links 39 are secured at their inner ends to each of pins 32, 33 and at their outer ends they are attached to pins 40 secured in circularly arranged segmental members 41, preferably four, which are inclosed or surrounded by a resilient, cylindrical metal band 42, the ends of which overlap each other and are disconnected to permit the band to be expanded by an outward, radial movement of the segmental members 41. The overlapped ends of the band 42 are tapered so that the periphery of the band forms a substantially true circular track or bearing surface for rollers 43 journaled in arms 44 attached to the inwardly extending end portions 16ᵇ of the carrier bars 16 of the penetrating members.

Normally these various parts occupy the positions in which they are shown in Fig. 3, the ground penetrating members being in their retracted, inoperative position, but when it is desired to move the penetrating members to their projected, operative position the hand lever 36 is moved forwardly, rocking rings 35 and 31 and moving pins 32, 33 substantially in radial alinement with pins 40 in the segmental members, which will cause links 39 to expand the segmental members, and band 42, to the positions in which they are shown in Fig. 4. The expansion of the ring 42 will move the inner ends 16ᵇ of carrier bars 16 outwardly, thus projecting the ground penetrating members into their operative position where they will be successively locked as heretofore described. When it is desired to withdraw the penetrating members to their retracted, inoperative position, the hand lever is released and the segmental members returned to their original position, which will permit band 42 to contract and the carrier bars 16 being relieved of the outward pressure exerted on rollers 43, the springs 22 will withdraw the penetrating members from their projected position to their inoperative position.

While only one form of actuating and locking mechanism has been illustrated it will be understood that various other forms within the scope of the appended claims may be readily designed without departing from the spirit of the present invention.

What is claimed is:

1. In a vehicle wheel, the combination of ground penetrating members adapted to be brought successively in contact with the ground, manually controlled means for moving said members into operative position, and means for successively locking said members in operative position by the rotative force of the wheel as said members are brought into contact with the ground.

2. In a vehicle wheel, the combination of ground penetrating members adapted to be brought successively in contact with the ground, manually operated means for moving said members into operative position, means for withdrawing said members from their operative position, means for successively locking said members in operative position by the rotative force of the wheel as said members are brought into contact with the ground, and means for successively releasing said locking means as the individual ground penetrating members are withdrawn from the ground.

3. In a vehicle wheel, the combination with the tread member, of a plurality of ground penetrating members adapted to be brought successively in contact with the ground, said members being movable into and out of operative position, manually controlled means for moving said members into their operative position and means for locking said members to the tread member in their operative position by the rotative force of the wheel.

4. In a vehicle wheel, the combination of the rim, and ground penetrating members adapted to be revolved about an axis coincident with the axis of the wheel, whereby they are successively brought into contact with the ground, said wheel and rim being free to rotate to a limited extent independently of said members when the latter are brought into contact with the ground, each of said members having a recess therein facing in a direction opposite to that in which the rim is rotated, said recesses being in alinement with the rim, whereby the rotative force of the wheel will force the rim into said recesses as the ground penetrating members are successively brought into contact with the ground to lock said members in operative position.

5. In a vehicle wheel, the combination of the rim, ground penetrating members adapted to be revolved about an axis coincident with the axis of the wheel, whereby they are successively brought into contact with the ground, said wheel and rim being free to rotate to a limited extent independently of said members when the latter are brought into contact with the ground, and a locking member formed on each of said penetrating members in alinement with the rim, whereby the rotative force of the wheel will advance the rim into engagement with said locking members as the penetrating members are successively brought in contact with the ground to lock the latter members in operative position.

6. In a vehicle wheel, the combination of the rim carried thereby, ground penetrating members normally positioned within the tread surface of the rim and adapted to be revolved about an axis coincident with the axis of the wheel, whereby they are successively brought in contact with the ground, said wheel being free to rotate to a limited extent independently of said members when the latter are brought in contact with the ground, each of said members having a recess therein facing in a direction opposite to that in which the rim and wheel is rotated, and means for moving said ground penetrating members to project them beyond the tread surface of the rim and the recesses in alinement with the rim, whereby the rotative force of the wheel and rim will advance said rim into the recesses in the ground penetrating members as the latter are successively brought in contact with the ground.

7. In a vehicle wheel, the combination of the rim, ground penetrating members normally positioned within the tread surface of the rim, means for projecting the ground penetrating members into operative position beyond the tread surface of the rim, said ground penetrating members being adapted to be revolved about an axis coincident with the axis of the wheel and rim whereby they are successively brought in contact with the ground, said wheel and rim being free to rotate to a limited extent independently of said members, a locking member formed on each of the ground penetrating members adapted to be moved into alinement with the rim when the ground penetrating members are projected into operative position, and means for yieldingly retaining the locking members and rim out of engagement, said yielding retaining means being adapted to be overcome by the rotative force of the wheel when the ground penetrating members are in contact with the ground, 8. In a vehicle wheel, the combination with the tread member, of movable ground penetrating members normally positioned within the tread surface of the tread member, an expansible member coöperating with the ground penetrating members, and means for expanding said expansible member to move the ground penetrating members beyond the tread surface of the tread members.

9. In a vehicle wheel, the combination with the rim, of radially movable ground penetrating members normally positioned within the tread surface of the rim, an expansible member coöperating with the ground penetrating members, means for expanding said expansible member to project the ground penetrating members beyond the tread surface of the rim into operative position, said ground penetrating members being adapted to be revolved about an axis coincident with the axis of the rim and wheel, whereby they are brought successively into contact with the ground, and means for successively locking the ground penetrating members in operative position by the rotative force of the rim as said members come in contact with the ground.

10. In a vehicle wheel, the combination with the rim, of radially movable ground penetrating members normally positioned within the tread surface of the rim, means for yieldingly retaining said members in their normal position, an expansible member coöperating with the ground-penetrating members, means for yieldingly holding the expansible member contracted, means for expanding said member to project the penetrating members into operative position beyond the tread surface of the rim, said ground penetrating members being adapted to be revolved about an axis coincident with the axis of the rim and wheel, whereby they are brought successively into contact with the ground, and means for successively locking the ground penetrating members in operative position by the rotative force of the rim, as said members come in contact with the ground.

11. In a vehicle wheel, the combination with the rim, of radially movable ground penetrating members normally positioned within the tread surface of the rim, an expansible member coöperating with the ground penetrating members, means for yieldingly holding the expansible member contracted, means for expanding said member to project the penetrating members into operative position beyond the tread surface of the rim, a locking member formed on each of the ground penetrating members adapted to be moved into alinement with the rim when the ground penetrating members are projected into operative position, and means for yieldingly retaining the locking members and rim out of engagement, said yielding retaining means being adapted to be overcome by the rotative force of the wheel when the ground penetrating members are in contact with the ground.

ARTHURL L. FITZ GIBBON.